(12) United States Patent  
Seppala et al.

(10) Patent No.: US 9,234,140 B2  
(45) Date of Patent: Jan. 12, 2016

(54) PROCESS AND ROTARY MACHINE TYPE REACTOR

(71) Applicant: Coolbrook Oy, Helsinki (FI)

(72) Inventors: Jukka Seppala, Helsinki (FI); Jyrki Hiltunen, Sannainen (FI); Veli-Matti Purola, Hamari (FI)

(73) Assignee: COOLBROOK OY, Helsinki (FI)

( * ) Notice: Subject to any disclaimer, the term of this patent is extended or adjusted under 35 U.S.C. 154(b) by 457 days.

(21) Appl. No.: 13/774,096

(22) Filed: Feb. 22, 2013

(65) Prior Publication Data

US 2014/0243569 A1    Aug. 28, 2014

(51) Int. Cl.

| | |
|---|---|
| *B01J 19/00* | (2006.01) |
| *C10G 3/00* | (2006.01) |
| *C10G 9/00* | (2006.01) |
| *B01J 19/18* | (2006.01) |
| *B01J 19/24* | (2006.01) |
| *B06B 1/10* | (2006.01) |
| *B06B 1/16* | (2006.01) |

(52) U.S. Cl.  
CPC .. *C10G 9/00* (2013.01); *C10G 3/00* (2013.01); *C10G 3/40* (2013.01)

(58) Field of Classification Search  
CPC ............ B01J 19/00; B01J 19/18; B01J 19/24; B01J 2219/24; C10G 3/00; C10G 3/40; C10G 9/00; B06B 1/10; B06B 1/16  
See application file for complete search history.

(56) References Cited

U.S. PATENT DOCUMENTS 5,370,999 A * 12/1994 Stuart ....................... C13K 1/02  
435/105  
2005/0072152 A1 * 4/2005 Suzuki ....................... C01B 3/56  
60/649

* cited by examiner

*Primary Examiner* — Natasha Young  
(74) *Attorney, Agent, or Firm* — Young & Thompson (57) ABSTRACT

A rotary machine type shock wave reactor suitable for thermal cracking of hydrocarbon-containing materials includes a casing, a rotor whose periphery contains an axial-flow blade cascade, and a directing rim, provided with at least two stationary vane cascades, adjoining an axial-flow rotor cascade, wherein the casing substantially encloses the periphery of the rotor and the directing rim. The cascades are configured to direct feedstock containing process stream to repeatedly pass the cascades in a helical trajectory while propagating within the duct between the inlet and exit and to generate stationary shock-waves to heat the feedstock. The axial-flow rotor cascade is configured to provide kinetic energy and add velocity to feedstock containing process stream, and the stationary vanes located downstream the rotor cascade are configured to reduce the velocity of the stream and convert kinetic energy into heat. The reactor may also process carbohydrate-and glyceride-based feedstock, and gaseous biomass matter.

36 Claims, 9 Drawing Sheets

PROCESS AND ROTARY MACHINE TYPE REACTOR

FIELD OF THE INVENTION

The present invention relates to the field of oil- and petrochemical refinement and in particular to the reactors for thermal cracking of hydrocarbon-containing compounds.

BACKGROUND

Cracking processes historically have been utilized in oil refineries and petrochemical plants to convert heavy hydrocarbon streams into lighter hydrocarbon fractions. Although the field of oil- and petrochemical refinement is referred to as one of the well-established and deep-rooted technological areas, one of the trends, emerging in oil- and petrochemical industry, requires that any developing technology would meet two major requirements. Those requirements may be briefly formulated as energy saving and reducing consumption of feedstock extracted from the non-renewable sources of raw materials. Those are also issues to consider for the development of one of the main petrochemical processes—large-scale production of lower (low molecular weight) olefins.

Low-molecular olefins, such as ethylene, propylene and butylenes, are the basic products of petrochemical industry and serve as a feedstock in commercial production of plastics, rubbers, polymers, elastomers and other synthetic materials, as well as of fibres and coatings. The existing production technology for lower olefins, comprising pyrolysis of medium weight hydrocarbons, such as naphtha or gasoil and light hydrocarbons like pentanes, butanes, propane and ethane, down to lightweight substantially unsaturated polymerizable components in the tubular furnace, was created more than half a century ago and hardly satisfies modern requirements of cost-effective feedstock utilization. Tubular furnaces have restrictions for the pyrolysis process: reaction temperature cannot be increased because tube material durability as well as heat transfer from tube walls to process gas has physical limits. This leads to feedstock residence time, which is not optimal for the process. Insufficient feedstock heating rate in tubular cracking furnaces lead to increased duration of pyrolysis process. This fact results in situation, when formed at initial stages olefins reside in the reactor furnace for sufficiently long time to begin entering into secondary reactions, natural consequence of which is a loss of a target product. Secondary product also includes coke, which causes heat transfer problems in tubes and fouling in equipment located downstream. Traditional technology does not offer a reasonable solution for eliminating of aforesaid problem, since heat transfer rates in radiant sections of conventional pyrolysis furnaces have already reached technical limits. In conventional tubular reactors heat is thus delivered to the reaction zone through the reactor walls.

Other than tubular furnaces solutions for pyrolysis equipment are known. Those include rotary reactors with complicated rotor blade arrangement. Costs for building and maintaining such equipment are higher than the profits that could be ever obtained by means thereof.

Traditional process for producing low-molecular weight hydrocarbons by thermal degradation thus encounters the following problems: 1. poor performance factor for tubular furnace reactors; 2. loss of valuable feedstock material; 3. long reaction times; 4. high secondary reactions rates; 4. high energy consumption; 5. non-optimum (less than possible) product yield and selectivity.

SUMMARY OF THE INVENTION

The objective of the invention is at least to alleviate above mentioned problems by implementing a novel method of thermal, thermo-chemical or catalytic thermo-chemical processing of feedstock, such as thermal cracking of hydrocarbon-containing compounds.

This objective is achieved by providing a rotary machine type reactor suitable for the pyrolysis of hydrocarbon-containing feedstock.

In one embodiment, the helical-path reactor comprises a rotor with a shaft and a disk provided with blades forming an axial-flow rotor blade cascade, a stationary directing ring-shaped rim optionally provided with at least two stationary vane cascades adjoining the axial-flow rotor cascade, and a casing. The outer surface of the directing rim arranged within the casing substantially defines the duct with the inner surface of the casing to remain there between. Alternatively, at least some of the stationary vane cascades could be formed on the duct wall-defining inner surface of the casing, for example. Cross-section of the duct in the meridian plane forms a ring-shaped profile.

The duct may comprise several dividing partitions arranged in such a way to create several operational chambers. Operational chambers are preferably of equal size; however, other technical implementations are possible whether appropriate.

The reactor comprises at least one inlet port for feedstock stream and at least one outlet port for product stream. The inlet port is preferably arranged after each dividing partition in the direction of rotation of the rotor and the outlet port is preferably arranged before the dividing partition. The inlet and outlet ports may be integrated within the duct.

The reactor may be further configured with a first stationary vane cascade arranged upstream the axial-flow rotor cascade; and with a second stationary vane cascade arranged downstream the axial-flow rotor cascade. Stationary vane cascades may be thus provided with the directing rim. Aforementioned stationary vane cascades are arranged in such a way, that a vaneless space is created between the first cascade exit point and the second cascade entrance point.

In one embodiment the reactor is configured to have all aforementioned vane cascades, i.e. both stationary cascades and a rotor cascade, to be substantially adjacent inside the duct In some embodiments three-dimensional arrangement of all cascades within the reactor is adapted to direct the feedstock containing process stream to repeatedly pass said cascades and a vaneless space in accordance with helical trajectory while propagating within the duct between the inlet and outlet ports and to sequentially generate stationary shockwaves to heat the feedstock within the reactor. The axial-flow rotor cascade is thus configured to provide kinetic energy to feedstock containing process stream thus adding velocity thereto, and the stationary cascade located downstream therefrom is configured to reduce velocity of the process stream and to convert kinetic energy into heat.

The provision of all cascades and vanes thereof is such, to allow a process stream flow velocity to be capable of reaching a speed in excess of the speed of sound (i.e. supersonic) at all cascades, while flow velocity in vaneless space within the duct remains subsonic.

In one embodiment the axial-flow rotor cascade is provided with working blades with a profile of active supersonic impulse turbine blades, which are rotor-mounted in such a way, to point by its concave side in a direction of rotor rotation.

In some embodiments the first stationary vane cascade is provided with a plurality of vanes having a curved profile and being disposed by their convex sides in the direction of rotor rotation; and the second stationary vane cascade is provided with a plurality of vanes having a curved supersonic compressor profile and being also disposed by their convex sides in a direction of rotor rotation.

In accordance to some other embodiment, the reactor is configured as an axial compressor type machine. The axial reactor of this embodiment comprises an elongated rotor, along which a plurality of rotor blades is arranged into a number of sequential rows to form an axial-flow rotor cascade (s). The rotor is enclosed within a casing, inner surface of which is provided with stator vane cascades arranged so that blades/vanes of rotor- and stator cascades alternate along the length of said rotor.

In various embodiments, the reactor is adapted to process fluid feedstock, preferably gaseous feedstock matter.

In some embodiments the reactor is adapted to process oxygen-containing feedstock matter, such as carbohydrate- and glyceride (such as e.g. triglyceride)-based feedstock matter.

In still another embodiment the reactor is adapted to process biomass-based, preferably cellulose-derived or in particular lignocellulose-derived feedstock matter provided into the reactor in gaseous form.

In another aspect of the invention a reactor assembly is provided, comprising a reactor of the present invention, connected to the drive engine, a heat recovery unit and a quenching unit.

In still another aspect of the invention an arrangement in the form of a pyrolysis plant is provided, said arrangement comprises at least two reactors of the present invention connected in series or in parallel.

In a further aspect of the invention a method for thermal cracking of hydrocarbon-containing feedstock utilizing an embodiment of a reactor disclosed herein is provided.

In still further aspect of the invention, a method of importing energy for fast endothermic chemical reaction by means of shock waves, produced from mechanical energy of rotating blade cascades of the reactor disclosed herein, is provided.

The utility of the present invention arises from a variety of reasons depending on each particular embodiment thereof. Firstly, the rotary machine type reactor implemented in accordance with some embodiments enables conducting a novel cracking process under conditions close to an operation mode of a perfect flow-displacement reactor. The rotary machine type reactor thus provides a new method for a pyrolysis of hydrocarbon-containing compounds, in particular suitable for obtaining low molecular weight hydrocarbon-containing compounds. Reactor design is based on a high speed rotor that transforms the mechanical energy to the high thermal energy inside the reactor, and the pyrolysis process provided herein differs from a conventional thermal cracking technique by a method of heat supply to reacting mixture. Whereas in conventional tubular pyrolysis furnace heat for pyrolysis is transferred through tubular coil wall, the reactor disclosed herein is configured to enable heat generation directly inside the reacting mixture.

The decomposition reactions in the reactor take place due to heat generated directly in feedstock containing process stream when it passes through series of stationary shock waves of high intensity. Such method of heat supply enables significant decrease in temperature of the walls confining the reaction zone, thus providing an opportunity to overcome limitations in speed of heat supply, otherwise typical to tubular furnace. The time that feedstock gas spends in the reaction zone, which consists of space limited by stationary and rotor cascades and vaneless space, is very short (approximately 0.01 seconds or less), that is about 10 times shorter comparing to a conventional pyrolysis furnace. The process thus becomes more controllable than conventional thermal cracking, although chemical reactions remain substantially the same. The yield of desired pyrolysis products increases because it is possible to decrease pressure and reduce time of residence of feedstock gas in the reaction zone, as well as due to a more uniform temperature profile in a cross-section of the process stream. Since the aforesaid process is characterized with extremely high yield of main products, such as olefins, for example, the technology thus provided represents in the first place a next step in a development of cracking processes to produce additional value from a smaller amount of feedstock, such as oil and gas. Utilization of said reactors in industry enables more cost-effective processing of raw materials therefore positively effecting efficiency and profitability of oil refinement plants.

Secondly, the provision of rotary machine type reactor makes it possible to solve a coke formation problem. The reason for reduced coke formation rate in comparison to the conventional technology is lower residence time of gaseous feedstock in the reaction zone combined with lower temperatures of reactor static parts (walls). Furthermore lower residence times favour reaction selectivity towards desired products.

The reactor of the invention also enables processing of oxygen-containing feedstock materials derived e.g. from bio-based feedstock. Other possible application areas for said reactor include therefore refining of biomass or biomass-derived matter to produce renewable fuels in processes such as direct catalytic hydrogenation of plant oil (e.g. pine oil) or animal fats into corresponding alkanes, for example. Still further, valorization of bio-based pyrolysis gas or synthesis gas may be implemented by means of the present reactor, wherein the term "valorization" is referred in present document as to indicate enhancement or refinement of gaseous matter.

Alternatively or additionally the reactor of the invention may be provided with catalytic surface(s) to enable catalytic reactions.

With special concern to various embodiments of an axial compressor- or turbine-type reactor of the present invention, a so called plug flow model may be attained. At the same time non-desirable side reactions, taking place in the rotor chamber as a result of product and feedstock mixing and leading to coking may be avoided with the arrangement proposed. Stationary vane cascades utilized herewith may be of a same- or at least of a similar type, in comparison to other rotary reactor solutions proposed earlier, in which blades of two distinct stator cascades have different structure and position angle.

The terms "pyrolysis" and "cracking" are utilized in this disclosure largely as synonyms regarding the process of thermal degradation of heavier hydrocarbon-containing compounds to lighter hydrocarbon-containing compounds.

The expression "a number of" refers herein to any positive integer starting from one (1), e.g. to one, two, three and so forth.

The expression "a plurality of" refers herein to any positive integer starting from two (2), e.g. to two, three, four and so forth.

The terms "first" and "second" do not denote herein any particular priority or order, unless explicitly stated otherwise. Instead, they are used to distinguish one entity, such as a physical element, from other entity.

The term "fluid" refers herein largely to a gaseous matter, such as e.g. process stream gaseous phase either in presence or absence of steam diluent.

The term "chord" refers herein to indicate a straight line, connecting endpoints of the arc, herein, a curved blade/vane.

The term "gasified" is utilized herein to indicate matter being converted into a gaseous form by any possible means.

The term "hydrodynamic" is utilized herein to indicate the dynamics of fluids, which are, in this disclosure, largely represented by gases. Therefore said term is utilized in this disclosure as a synonym to the term "aerodynamic".

Different embodiments of the present invention will become apparent by consideration of the detailed description and accompanying drawings.

DETAILED DESCRIPTION OF THE EMBODIMENTS

Detailed embodiments of the present invention are disclosed herein with the reference to accompanying drawings. The same reference characters are used throughout the drawings to refer to same members. Following citations are used for the members:
1—a rotor shaft;
1a—a rotor disk;
2—an axial-flow cascade with rotor blades;
3—a directing rim;
4—a casing;
5—dividing partitions;
6—a feed inlet port;
6a—a second feed inlet port or steam injection port;
7—a product outlet port;
8—a first stationary cascade with nozzle vanes;
9—a second stationary cascade with diffusing vanes;
10—a duct with a vaneless space;
11a—a rotary machine type reactor according to first embodiment;
11b—a rotary machine type reactor according to second embodiment;
11c—an operational module comprising of at least two interconnected reactors in accordance with one feasible embodiment;
12—catalytic element;
13—cooling media injection port;
14—cooling or heating port;
101—a drive engine;
102—a rotary machine type reactor;
103—a heat-recovery unit;
104—a quenching unit;
105—an air filter.

Figure 1:
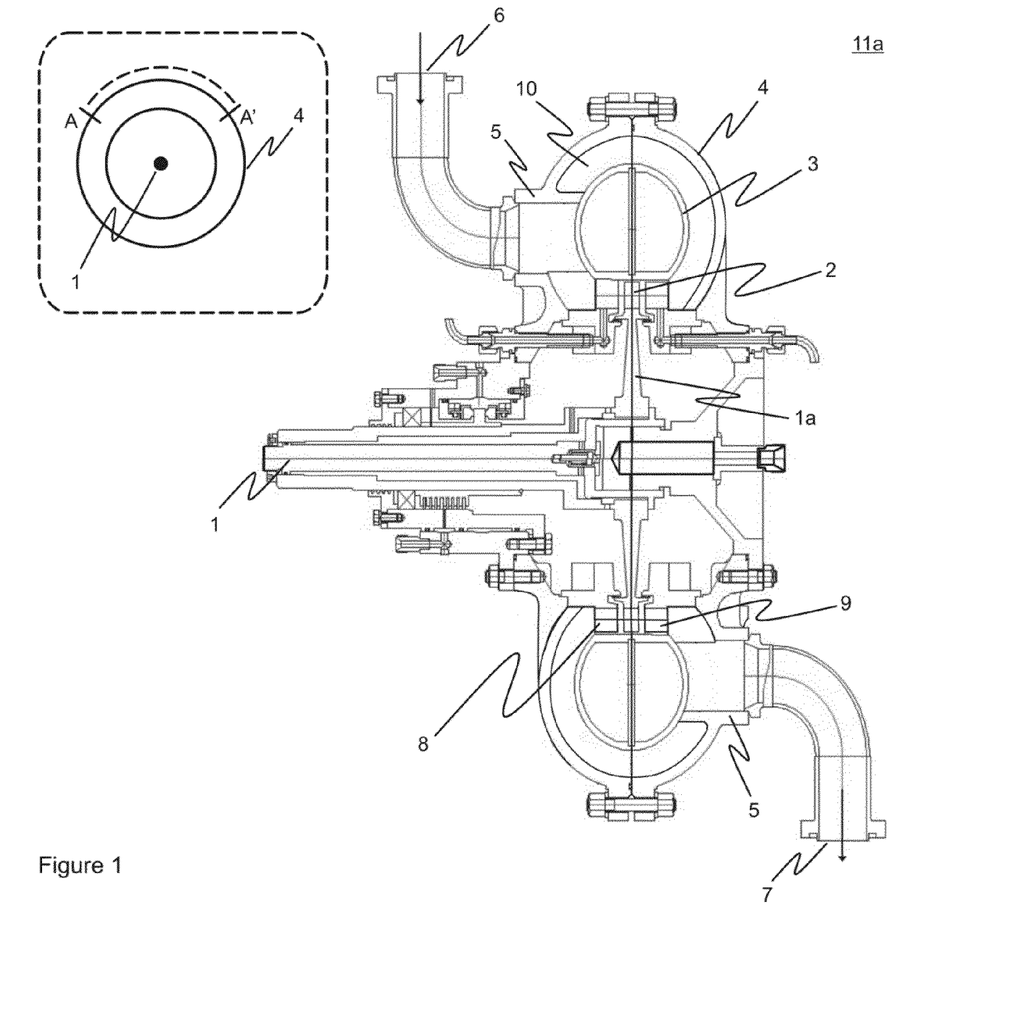
FIG. 1 illustrates one embodiment of a reactor in accordance with the present invention for pyrolysis of hydrocarbon-containing feedstock.

A sectional illustration (see section A-A' as indicated in the embedded miniature sketch of a reactor top view, dashed box) of a helical-path reactor 11a for the pyrolysis of hydrocarbon-containing feedstock in accordance to one embodiment of the present invention is shown in FIG. 1. The reactor comprises a rotor provided with a rotor shaft 1, to which a rotor disk 1a is secured. The rotor disk 1a is in turn provided with a plurality of rotor blades forming an axial-flow rotor cascade 2. The axial-flow rotor cascade rotor blades preferably have a profile of active supersonic impulse turbine blade; they are directed radially and installed by their concave side in a direction of rotor rotation. Circumferential velocity of rotor blades is adapted to be at least 250 m/s. The reactor 11a further comprises an internal stationary ring-shaped rim 3, which adjoins the tips of axial-flow rotor blades, and an inner surface of casing 4. The outer casing 4 encloses a periphery of the rotor 1 and the rim 3 to define an annular duct 10 to remain between an outer surface of the rim 3 and an inner surface of the casing 4. A meridian cross-section of the duct 10 thus forms a ring-shaped profile. The reactor 11a further comprises at least at least one inlet port 6 for feedstock stream and at least one outlet port 7 for product stream. Whether appropriate, the reactor 11a may be configured to have two inlet- and two outlet ports.

Figure 2A:
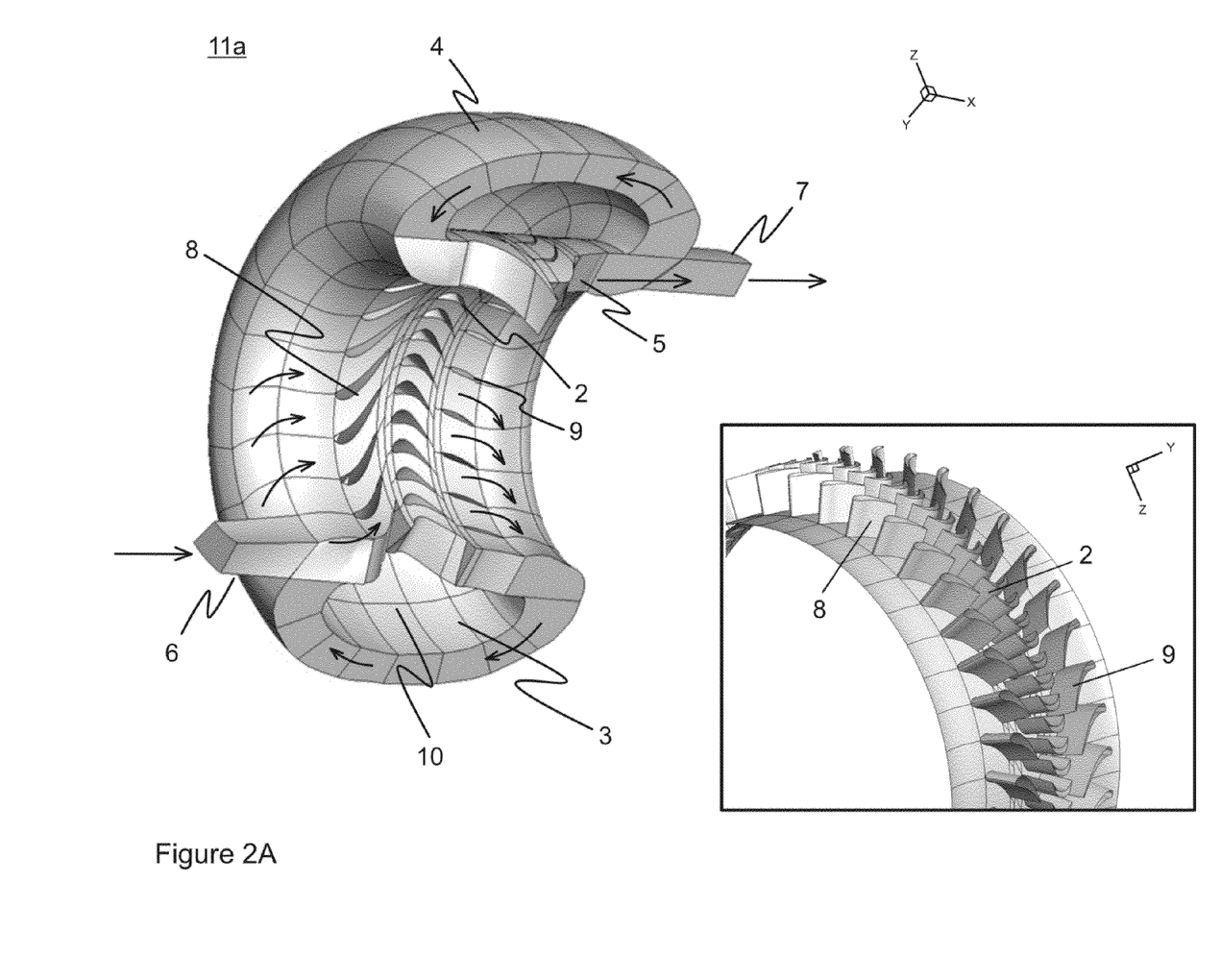
FIG. 2A illustrates an internal arrangement of the reactor of FIG. 1.

The reactor 11a provided with this embodiment is implemented substantially in a shape of a ring torus. FIG. 2A thus provides a poloidal cross-section of a torus-shaped reactor in order to show spatial positions of inlet- and outlet ports with regards to a substantially ring-shaped structure.

An interior of the duct 10 may be implemented undivided. In alternative embodiment the duct 10 may comprise several dividing partitions 5 arranged therein so as to form at least two operational chambers (FIG. 2A). Size of said chambers is preferably the same; however other technical implementations are not excluded, where appropriate. The inlet port 6 is preferably arranged after each dividing partition 5 in the direction of rotor rotation and the outlet port 7 is preferably arranged before each dividing partition 5. The inlet and outlet ports may be integrated within the duct.

Figure 2B:
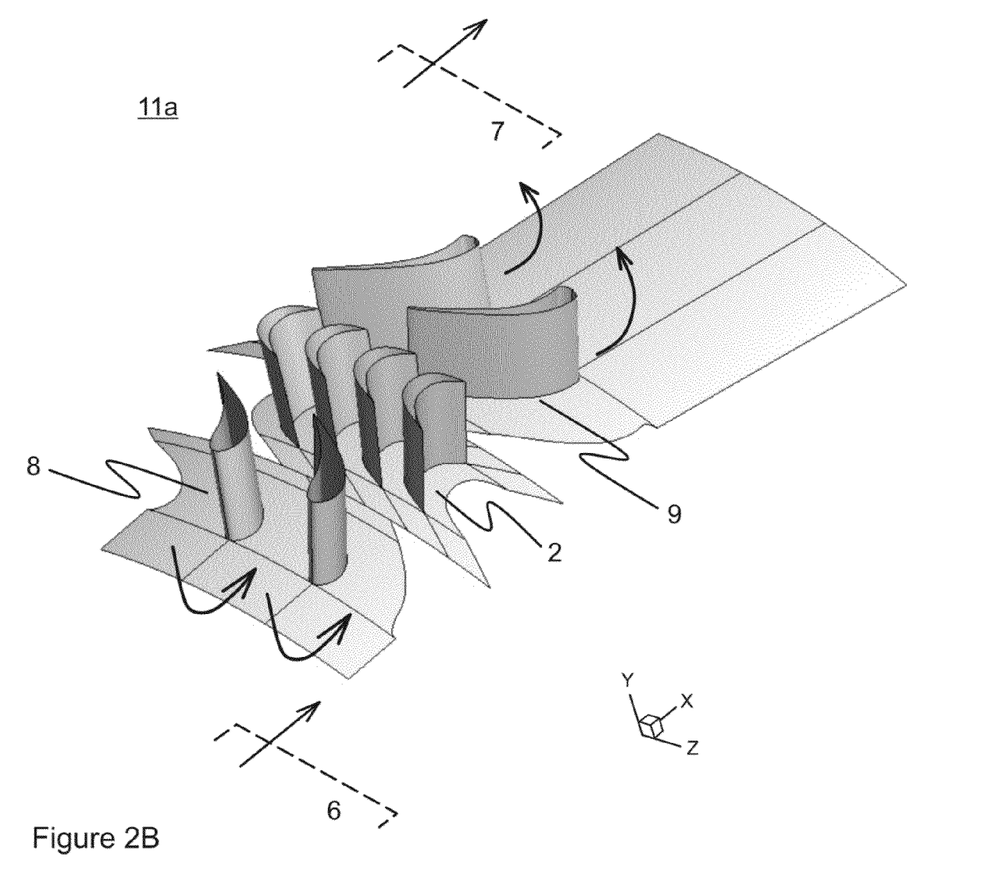
FIG. 2B illustrates vane arrangement and a stream flow in the reactor of FIG. 2A in more detail.
Figure 2C:
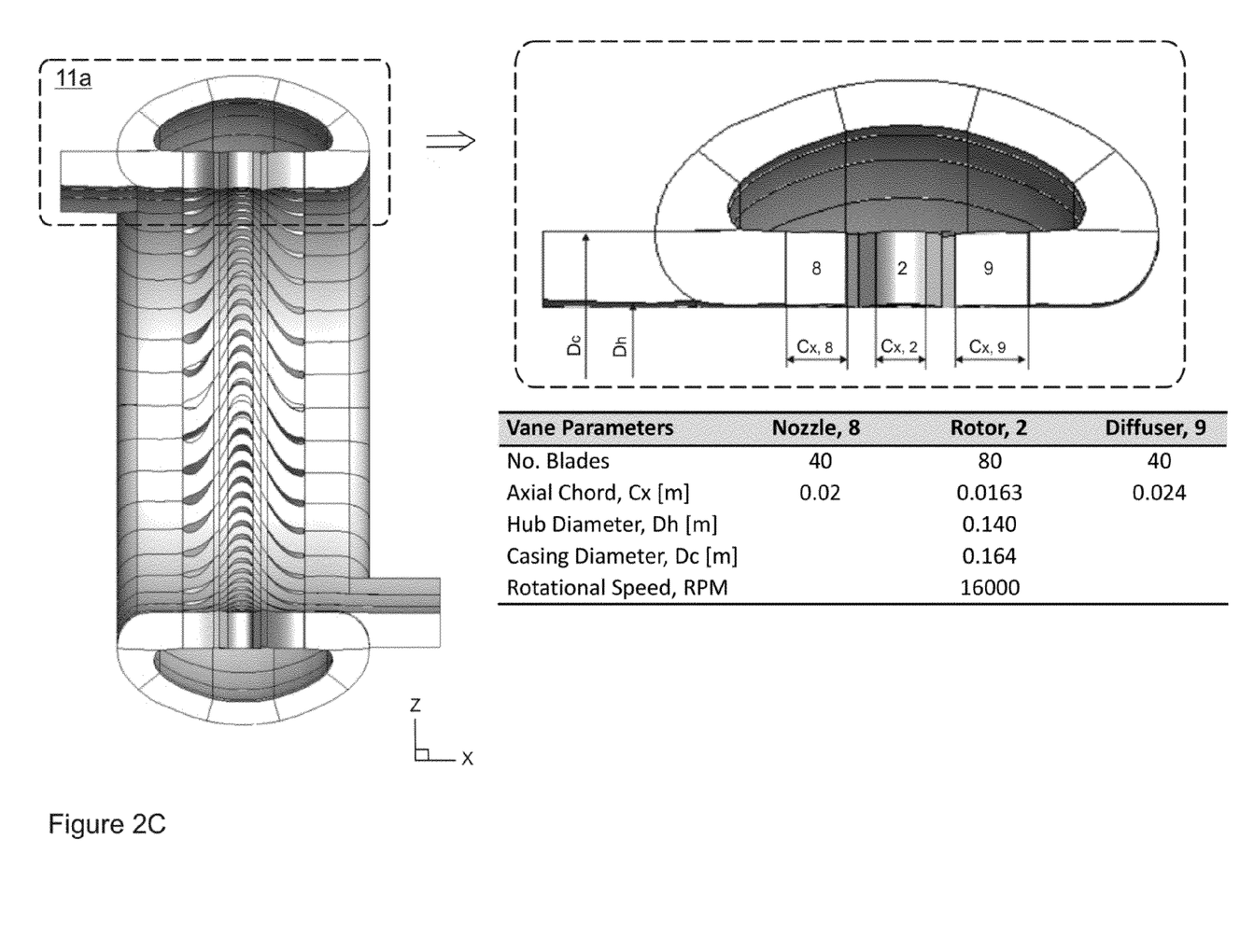
FIG. 2C illustrates geometrical parameter and operating conditions for the reactor of FIGS. 1 and 2A,B.

Reference will next be made to FIGS. 2A-C, created on the basis of CFD (Computational Fluid Dynamics) simulation models of the reactor 11a. Representation of FIG. 2B herein corresponds to a single computational domain, utilized for CFD calculations.

The ring torus-shaped reactor 11a is further provided with at least two stationary (stator) vane cascades 8, 9. A first stationary vane cascade 8 is thus arranged upstream the axial-flow rotor blade cascade 2 and comprises a plurality of vanes preferably having a curved profile and being disposed by their convex sides in the direction of rotor rotation. The vanes of the first stationary cascade 8 are preferably configured as nozzle vanes, therefore for clarity purposes the first cascade will be further referred as a "nozzle cascade".

A second stationary vane cascade 9 is arranged downstream the axial-flow rotor cascade 2 and comprises a plurality of vanes preferably having a curved supersonic compressor profile and being also disposed by their convex sides in the rotor rotation direction. The vanes of the second stationary cascade 9 are preferably configured as diffusing vanes, therefore for clarity purposes the second cascade will be further referred as a "diffusing cascade".

Vanes provided with both stationary vane cascades (8, 9) may be implemented to have a curved profile same for both cascades.

Stationary vane cascades 8, 9 may be provided with the directing rim 3 (FIG. 1, 2A) or on the duct-defining wall of the inner surface of the casing 4 as being evident on the basis of the figure (see box on FIG. 2A). Stationary vane cascades 8 and 9 are preferably arranged in such a way that a vaneless space is formed between an exit from the diffusing cascade 9 and an entry into the nozzle cascade 8.

In accordance with some embodiments, the reactor 11a is configured to have the cascades 2, 8 and 9 to be substantially adjacent within the duct 10.

FIG. 2C illustrates geometrical parameters for the reactor 11a and one set of operating conditions.

Reactor operation principle is based on a conversion of kinetic energy of a process stream into heat. The provision of the reactor 11a is such, that heat for processing feedstock molecules is not transferred through the walls of the reactor, but a mixture of evaporated feedstock and steam entering into the reactor is heated by heat generated directly inside reacting mixture due to aerodynamic drag of the vanes provided with vane cascades.

The reactor 11a operates substantially as follows. Rotation of the rotor 1 forces the gas in each operational chamber to be transferred from the inlet port 6 to the outlet port 7. Feedstock containing process stream, comprising e.g. hydrocarbon-based feedstock and a steam diluent (provided under pressure from peripheral sources, not shown) in adjustable ratios, is supplied into the reactor inlet port 6. Feedstock-diluent ratio is largely dependent on the pressure formed within the reactor duct; decrease in pressure thus results in reduced amount of steam diluent being supplied into the reactor with process stream. Feedstock containing process stream is further directed to repeatedly pass through the nozzle cascade 8, axial-flow cascade 2, diffusing cascade 9 and the vaneless space in accordance with helical trajectory while circulating within the duct 10 between the inlet and outlet ports. The provision of cascades 2, 8 and 9 and vanes located thereto is such, to allow a process stream flow velocity to be supersonic at all cascades, while flow velocity in vaneless space within the duct 10 remains subsonic. Since feedstock containing process stream is continuously forced to pass through stator-rotor-stator cascades following helical trajectory, the reactor is occasionally referred within present disclosure as a helical-path reactor.

Figure 3A:
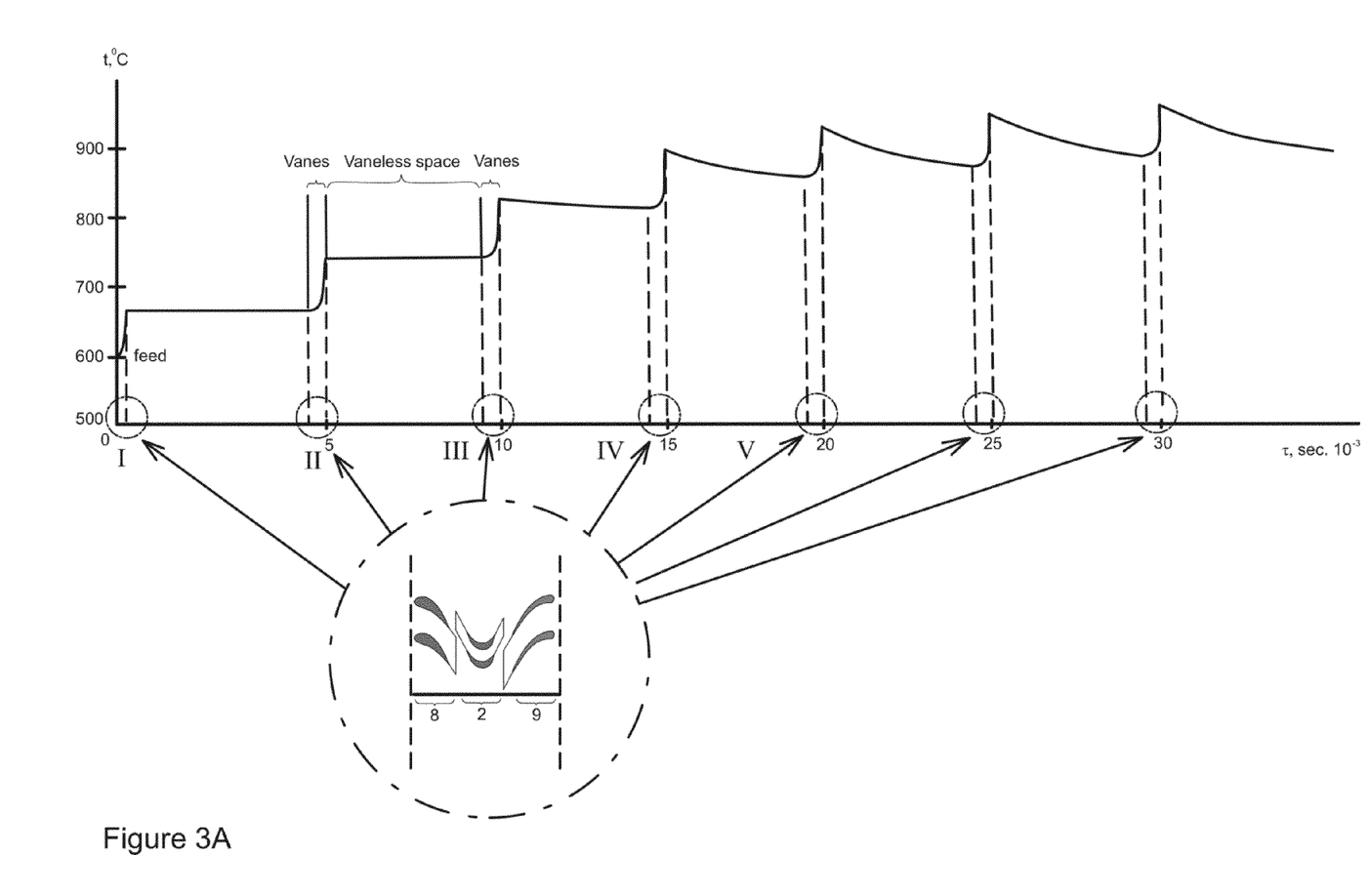
FIG. 3A is a temperature history chart of stream gas within the reactor of FIGS. 1-2.

The axial-flow rotor cascade 2 is additionally configured to provide kinetic energy to feedstock containing process stream thus adding flow velocity thereto, whereas the diffusing cascade 9 is configured to reduce flow velocity of process stream passing therethrough. During time of residence within the reaction zone the feedstock containing process stream passes through cascades 8, 2, and 9, respectively, several times and each time while passing through the axial-flow rotor cascade 2 the process stream is accelerated, thus receiving kinetic energy further converted into heat upon reduction of flow velocity in the diffusing cascade 9. The established movement thereby generates stationary shock-waves which heat gaseous feedstock within the reactor. Indeed, the process stream is heated in sequential impulses during the time said stream is affected by stationary shock waves of high intensity. FIG. 3A illustrates a time-dependent temperature curve generated by a process stream during residence time within the exemplary model reactor 11a. Dashed lines indicate the moments the process stream passes stator-rotor-stator cascades 8, 2, 9 and dashed circles define process stages (I-V). Temperature curve of FIG. 3A has therefore a saw-tooth configuration with overall temperature increase from about 500 to almost 1000° C. Feedstock is directed into the reactor at approximately 600° C. and further heats up, subsequently passing through vane cascades and vaneless space. Such an arrangement results in a fact, that all process stream particles possess essentially the same temperature histories. The latter fact brings the helical-path reactor, in terms of technical characteristics thereof, close to a perfect plug flow type reactor. Exemplary temperature history chart, shown on FIG. 3A, was obtained by simulation modeling of the ring torus-shaped reactor, assuming that a sum of kinetic energies of ordered motion (flow of particles) and chaotic motion of separate molecules is constant when gaseous feedstock flow passes through cascades (steady flow simulation).

For an exemplary model reactor 11a (FIG. 3A) it took five stages (I-V) to get temperature up to 900° C. at which temperature endothermic reactions consume most of the heat input, since energy input afterwards will be used purely for cracking instead of further rising the temperature. The process of thermal cracking may thus be performed in the reactor of this embodiment during multiple transitions of feedstock process stream through stationary shock waves of high intensity at supersonic speed. Noticeable temperature jump occurs when stationary shock waves appear at an inlet of inter-vane canals of diffusing cascade 9.

Figure 3B:
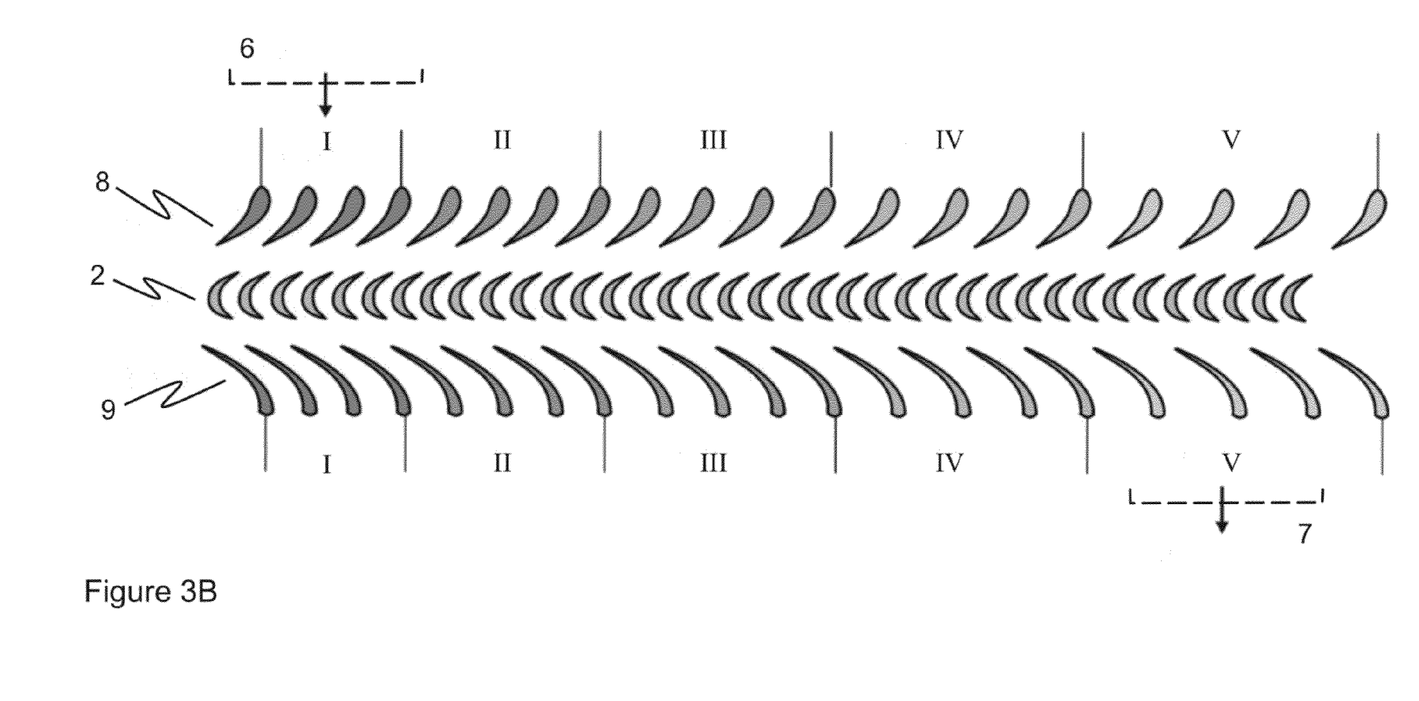
FIG. 3B illustrates vane distribution within the reactor of FIGS. 1-2.

FIG. 3B illustrates blade/vane distribution within the exemplary reactor 11a. Due to increase in temperature during the regenerative compression/energy addition process, the density of the process gas is changing along the reactor 11a from the inlet port 6 to the outlet port 7. Therefore distribution of stator vanes and pitch therebetween is non-uniform. FIG. 3B thus illustrates an exemplary five-stage arrangement as described above. For rotor, the pitch/chord ratio cannot be changed and it is fixed for 80 blades in total (see FIG. 2C) at a value 0.75, provided that each blade has an axial chord parameter of 16 mm (0.016 m) and mean radius of 0.151 m. Pitch/chord parameters for stationary cascades are provided in Table 1.

TABLE 1

Geometrical parameters for stator vane cascades.

| Stage | Nozzle cascade, 8 (Axial chord = 0.02 m) | | Diffusing cascade, 9 (Axial Chord = 0.024 m) | |
|---|---|---|---|---|
| | No. of Vanes | Pitch/Axial Chord | No. of Vanes | Pitch/Axial Chord |
| I | 66 | 0.7200 | 45 | 0.8783 |
| II | 60 | 0.7905 | 44 | 0.8983 |
| III | 53 | 0.8950 | 42 | 0.9413 |
| IV | 44 | 1.0780 | 40 | 0.9883 |
| V | 36 | 1.3175 | 36 | 1.0980 |

Although common pyrolysis reactions are conducted within present reactor at 500-1000° C., minimum "start" temperature required may be adjusted down to 200° C. For some biotech applications minimal temperature may be adjusted to extremely low values, such as room temperature, for example. Such biotech applications include processing of carbohydrates, such as sugars for example.

Pressure in the reactor duct 10 during operation is adjustable by adjusting inlet and exit pressures. For heavy hydrocarbons utilized as a gaseous feedstock the pressure in duct 10 may be about 2 bar abs (0.2 MPa); otherwise lower pressure settings may be preferable.

Reactor parameter may be adjusted so, that the time gaseous feedstock spends in the reaction zone (residence time)

varies from few seconds down to few milliseconds, preferably down to approximately 10 msec. Absolute residence time may depend on a number of process stages and the volume of vaneless space as indicated above (FIG. 3A).

Figure 4A:
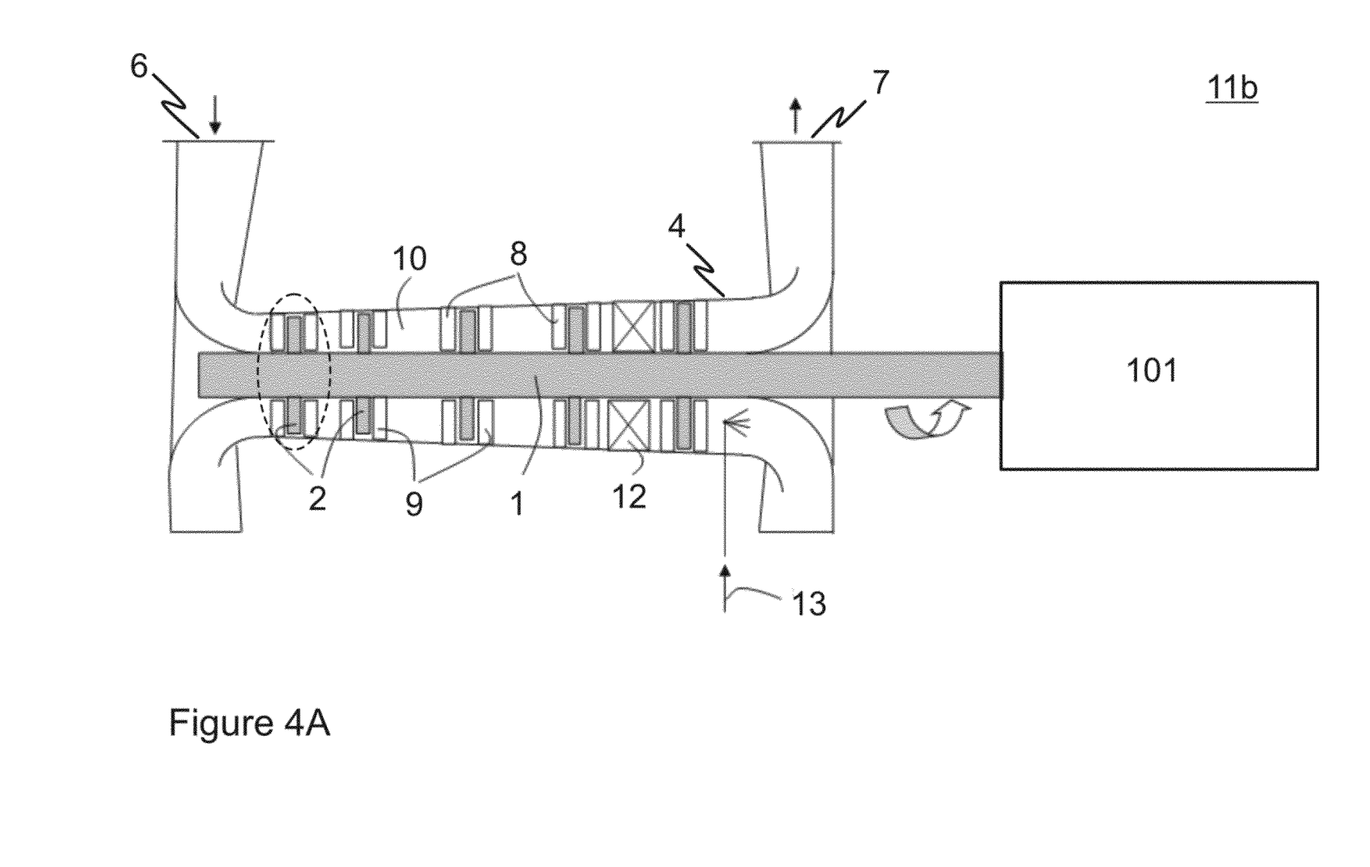
FIG. 4A illustrates another embodiment of the reactor, herein configured as an axial turbo-machine.

With reference to FIG. 4A, an alternative embodiment for another rotary reactor is illustrated. In accordance with this embodiment, the reactor 11b is configured as an axial compressor type reactor or a turbine. The reactor 11b of this embodiment comprises an extended (elongated) rotor 1, along which a plurality of rotor blades is arranged into a number of sequential rows to form axial-flow rotor cascade(s) 2.

The rotor 1 is enclosed within the casing 4, inner surface of which is provided with the stationary (stator) first and second vane cascades 8 and 9, respectively, arranged such that blades/vanes of rotor- and stator cascades 2, 8 and 9 alternate along the rotor 1 in the longitudinal direction (along the rotor length). Stator cascade (8,9) vanes are preferably arranged on the opposite sides of the duct wall-defining inner surface of the casing 4. Thus, blades of the rotor cascade 2 at certain position along the rotor 1 in the longitudinal direction may be considered to form a so-called cascading unit, or a "stage", with the adjacent pairs of stator vanes (cascades 8 and 9), which is highlighted in the FIG. 4A by a dashed circle. The subsequent stages have blade/vane-free space between them. The space may contain further elements as reviewed hereinbelow. Other stage configurations are naturally possible when appropriate.

Volume provided between the rotor 1 and an inner surface of the casing 4 is defined as the duct 10 which thus encompasses rotor blade-2 and stator vane-8, 9 cascades. The reactor 11b further comprises at least one inlet port 6 for feedstock stream and at least one exit port 7 for product stream. The reactor 11b may comprise at least one additional port 13 for injection of cooling media, for example. Additionally, the reactor 11b may comprise catalytic elements or catalytic voids 12 (intermediate catalytic spaces), as disclosed further in more detail. Yet, selected blades and/or vanes may be provided with catalytic material e.g. in the form of a catalytic coating.

Disclosed for the previous embodiment stator vane non-uniform distribution may be adapted also for the axial reactor 11b.

Aforesaid configuration enables carrying out highly customized chemical processes, wherein reaction time, temperature and/or gaseous feedstock residence time in reaction zone may be tailored to achieve best selectivity/conversion ratios. To control temperature and/or dilution rates the reactor of this embodiment may comprise an additional steam injection port for reactive component and/or feed diluent. The provision of the reactor in accordance to this embodiment is such that when the feedstock gas stream enters the reaction chamber it is affected by heat produced by shock-waves originated from cooperative mechanical work of stationary vane cascades 8, 9 and the rotor blade cascade 2. Blade/vane configurations provided within rotor-stator cascades may be the same as for the previous embodiment; however an axial turbine-type implementation allows additional flexibility in adjusting reaction parameters by varying structural parameters of rotor- and stator cascade blades/vanes even within the rows, i.e. the design may alternate within sequential rows of the particular cascade.

Figure 4B:
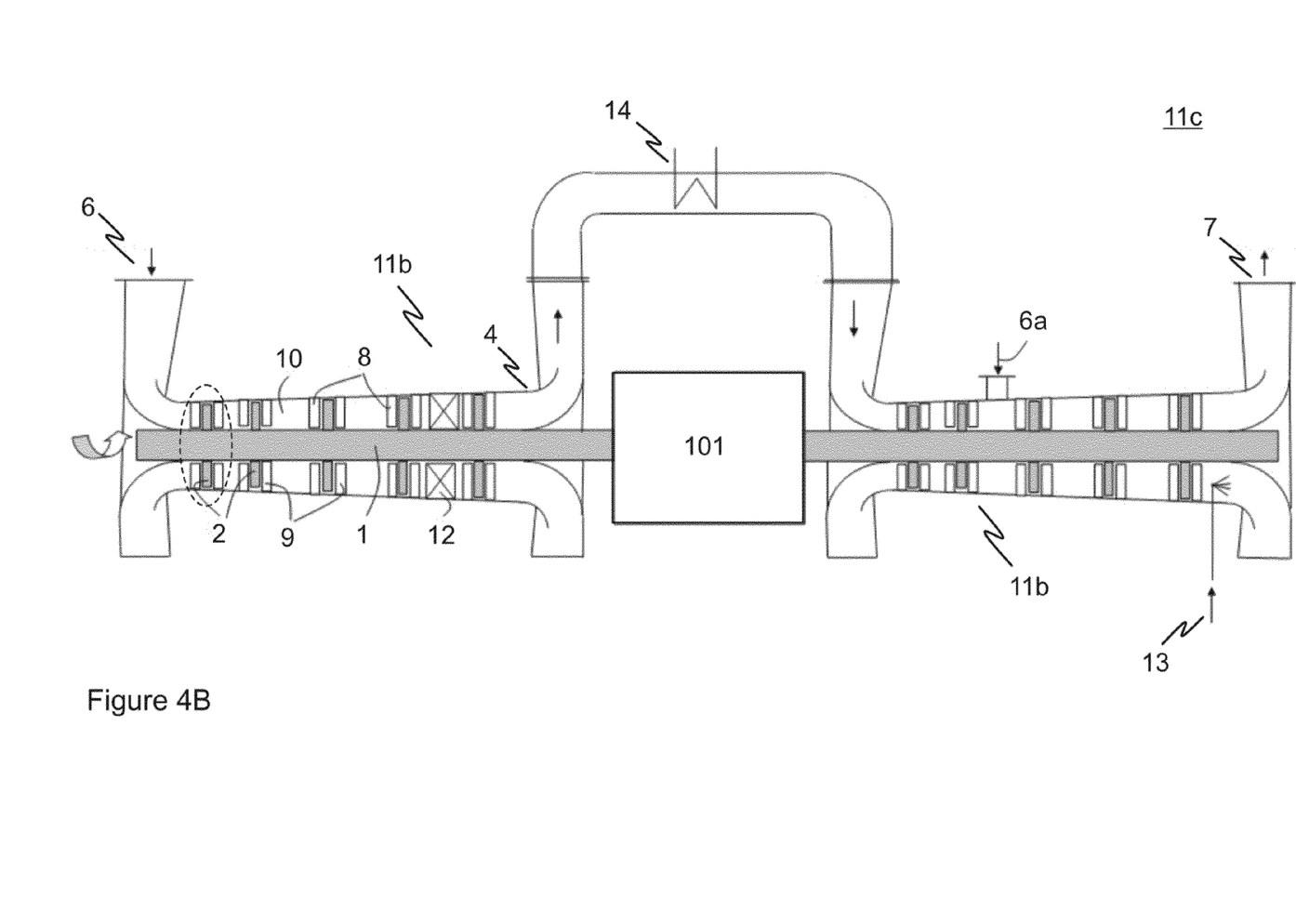
FIG. 4B illustrates sequential connection of two axial reactors of FIG. 4A.

An embodiment of an operational module 11c, comprising of at least two axial turbine-type reactors 11b of the aforesaid embodiment connected sequentially or in series, is shown on FIG. 4B. Configuration of FIG. 4B shows two interconnected reactor units 11b, therebetween a drive engine element 101 is located. "In-series" configuration may be provided with an additional inlet port 6a that may be utilized for extra feed injection or for steam injection, for example. An additional port 14 for bringing in cooling or heating media may be arranged at the connection pipe provided between two reactor units 11b. It is to be understood, however, that a final arrangement of an operational module 11c largely depends on size and purposes of the production line as well as on the number of separate reactor units therein.

As alluded hereinbefore, the reactors 11a, 11b in accordance with different embodiments of the present invention may be generally provided with catalytic surface(s) or other catalytic element(s) for enabling catalytic reactions. Catalytic surfaces are preferably formed by catalytic coating of at least some of the individual blades or vanes of at least one blade/vane cascade within the reaction zone. Vanes provided with the vane cascades and located within the reaction zone may be catalytically coated when appropriate. Alternatively or additionally catalytic coating may be applied to the duct wall-defining inner surface of the casing within the reaction zone, for example. Alternatively or additionally catalytic element (s) or catalytic void(s) may be arranged within the reaction zone, formed by or provided with ceramic or metallic substrate(s) or support carrier(s) with an active coating. Alternatively monolithic honeycomb catalysts may be utilized. Catalytic elements are indicated by numeral 12 in FIGS. 4A and 4B.

The reactors in accordance with various feasible embodiments as the ones described hereinbefore are typically adapted to process gaseous feedstock material and indeed, the rotary reactor may be configured to process oxygen-containing feedstock matter, for example. Choice of feedstock material may be therefore naturally extended beyond the limits defined by hydrocarbon-based feedstocks. In one embodiment the reactor may be adapted for biomass refining to produce renewable fuels in processes such as direct catalytic hydrogenation of plant oil into corresponding alkanes or catalytic dehydrogenation of gaseous hydrocarbons as one of the stages of Fischer-Tropsch process, for example. The reactor, adapted for biorefining, may be adapted to utilize gaseous biomass-based preprocessed feedstocks. With the reactor adjusted for gasified biomass processing, especially in combination with catalytically coated surfaces disclosed elsewhere in this document, a novel cost-effective method for production of renewable fuels may be developed. Another example of biorefining related application is catalytic high-temperature (about 900° C.) dimerization of methane, widely studied as a promising process for liquefaction of natural gas.

Figure 5:
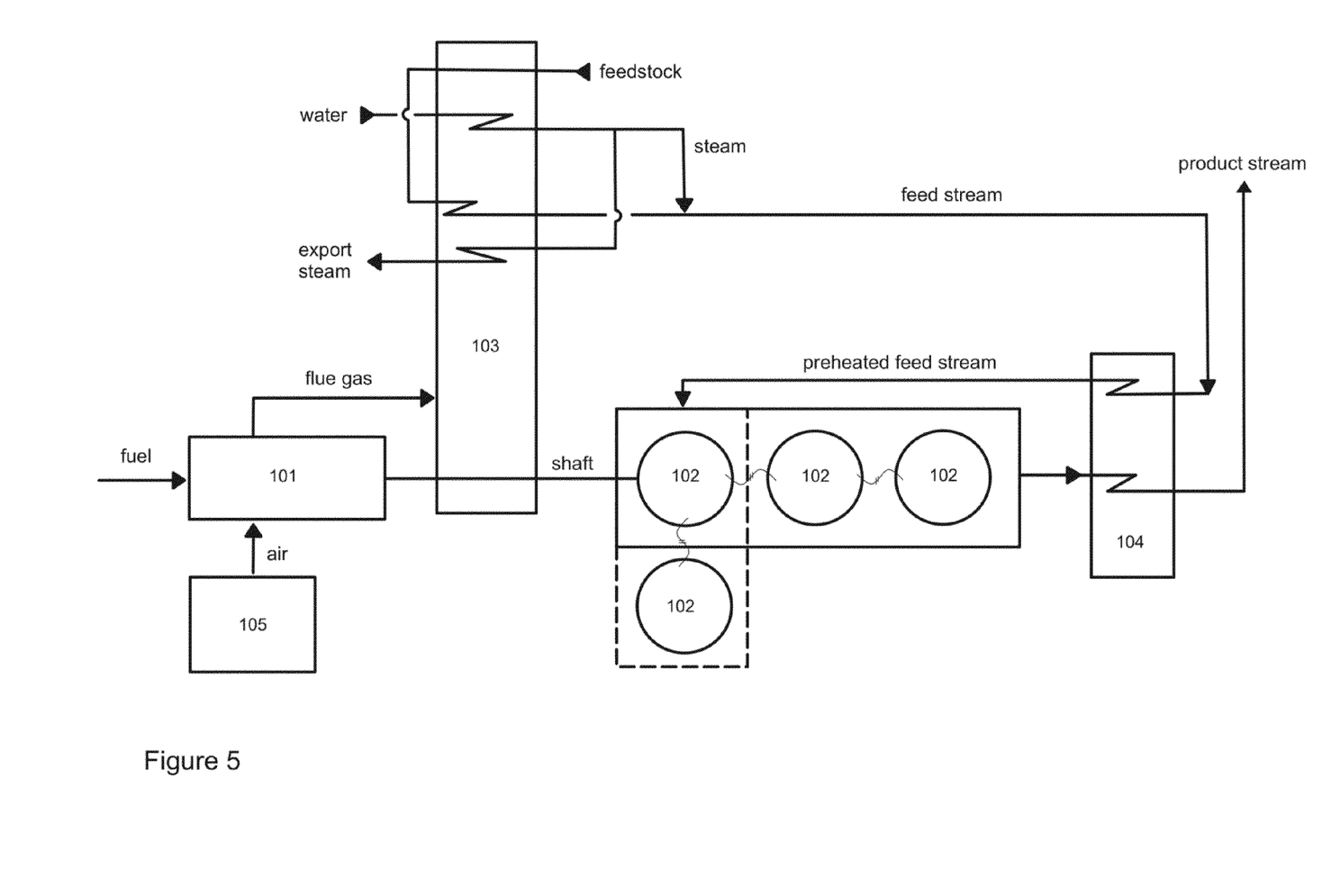
FIG. 5 is a high-level block diagram of a reactor assembly based on the reactor of the present invention.

A reactor assembly may be provided, comprising an embodiment of the reactor or the operational module of present invention, connected to the drive engine, a heat recovery unit and a quenching unit. One merely exemplary installation is shown in FIG. 5, which depicts a high-level block diagram of a reactor assembly based on the reactor(s) in accordance to any embodiment of the present invention and comprising an engine 101, at least one rotary machine type reactor 102, a heat-recovery unit 103, such as a steam-boiler, a quenching apparatus 104 and an air filter-muffler 105. Although above said installation may run with one rotary reactor 102, FIG. 5 illustrates two exemplary arrangements, wherein three reactors 102 may be connected either in parallel (dashed line box) or "in series" (solid line box). Functional connection between reactors 102 is indicated by crimped lines. The number of the reactors 102 and arrangement thereof on FIG. 5 is merely exemplary and in practice would largely depend on installation size/capacity and production volumes. The reactor provided hereto is preferably a cracking unit; however utilization thereof in other than cracking applications is not excluded.

The assembly may utilize various drive engines, such as electric motors, gas piston engines, gas turbine- and steam turbines. A gas turbine- or a gas piston engine, however, is proven to be one of the most feasible drive engines for the rotary reactor at present. The rotary reactor assembly may require substantially the same heating and/or cooling units as a conventional pyrolysis furnace installation. The rotary reactor may be thus configured to conveniently replace radiant section coils in a conventional cracking not affecting operation mode of the whole unit otherwise. Furthermore, the size of process downstream equipment may be reduced, in comparison to conventional plants, due to lower yields of by-products.

An example of a test drive for an operational model of the helical-path reactor assembly is further provided.

EXAMPLE 1

Test drive for an exemplary helical-path reactor assembly in comparison to conventional tubular pyrolysis furnaces of different manufacturers.

The small-capacity model of the helical-path reactor was developed and manufactured to evaluate technical feasibility of a new pyrolysis process in test drive conditions. In order to perform experiments a test stand was constructed. The major objective of testing series was obtaining data on pyrolysis product yield and composition. The model reactor was thus equipped with a 90 kW electric motor with a step-up gearing to drive the rotor. Technical features of the model reactor were as follows: volume of a reaction zone: $2 \times 10^{-3}$ m$^3$; rotor rotational speed: 18,000-20,000 rpm.

Process conditions settings during test-drives of the model reactor were similar to that usually utilized in reactors of commercial scale: temperature of pyrolysis reaction was about 900° C.; feedstock residence time in reaction zone was 0.025-0.030 sec; and exit pressure was about 1.2 bar abs. Naphtha with final boiling point of 170° C. was utilized as a feedstock. Feedstock containing process stream flow rate was about 40 kg/h and dilution of naphtha with steam comprised 50%. Sampling procedure, analysis of feedstock and pyrolysis reaction products, as well as calculation of product yield were inspected by experts in the field. Analysis of cracked gas was performed by two independent expert groups on different equipment (Varian CP-3800 and LHM-8MD).

During aforesaid drive tests, a procedure of thermal cracking (pyrolysis) of hydrocarbon-containing material was performed in a helical-path reactor for the first time. Test results confirmed that considerably higher main product yields were obtained in the helical-path reactor compared to that obtained in most advanced conventional tubular cracking furnaces. The data on main product yield per run during pyrolysis of naphtha are summarized in Table 2. Table 2 thus provides comparison data obtained from test drives of the model helical-path reactor and from conducting parallel reactions in conventional tubular cracking furnaces developed by leading companies, such as ABB Lummus, Technip and Kellogg, Brown and Root (KBR). Results show, that conducting pyrolysis in the helical-path reactor results in total yield improvement by more than 20%.

TABLE 2

Yield of main products per run during conducting pyrolysis reactions in the model helical-path reactor and in conventional tubular cracking furnaces.

| | Designer, type of reactor, cracked gas exit temperature (° C.) | | | | | | |
|---|---|---|---|---|---|---|---|
| | ABB Lummus | Technip | | KBR | | | |
| | SRT-VI | GK-4 | GK-5 | Millisecond | Helical-path reactor | | |
| Product | 862 | 848 | 835 | 900 | 882 | 891 | 902 |
| Ethylene | 30.30 | 29.03 | 30.50 | 34.40 | 42.06 | 42.64 | 43.32 |
| Propylene | 13.90 | 11.59 | 15.50 | 16.60 | 13.53 | 13.10 | 12.34 |
| Sum | 44.20 | 40.62 | 46.00 | 51.00 | 55.59 | 55.74 | 55.66 |

The data confirm that pyrolysis of same feedstock in an installation equipped with helical-path reactors results in 1.5 times increase of ultimate ethylene yield, whereas the sum of both ethylene and propylene ultimate yields can be increased in 1.25-1.3 times in comparison with installations equipped with tubular furnaces operating by conventional technologies.

Although ethylene and propylene are the main products of naphtha cracking process as described above, other valuable and useful by-products can be obtained therefrom. For example methane (and unseparated hydrogen), which are used as a fuel gas in conventional technology furnaces, may be utilized to drive helical path reactor's motors. Heavier valuable by-products, like gasoline and mixture of C4's, are also produced in the thermal cracking process. In the conventional technology ratio of these products with regards to cracked gas leaving pyrolysis unit is approximately 20 to 30%. With the helical path reactor this ratio is <20%. In practice that means that although the material margin of the process will be significantly reduced, but, with the lower yields of the by-products, the sizes of downstream equipment can be reduced and operation costs of separation units are likely to be lower.

In various aspects and embodiments of the present invention, through adjusting the internal pressure of the reactor by means of increasing or decreasing the rotation speed of the rotor, for example, the reaction itself and related parameters may be controlled. Further, the pressure of the inlet stream may be elevated by means of a compressor, for instance.

The reactor provided hereto is configured as a device for conducting high-temperature processes. A majority of the reactions, conducted herein, are endothermic, because of short residence times feedstock spends in the reaction chamber. Conducting reactions accompanied with heat release (i.e. exothermic) is not, however, excluded.

The reactor provided in various aspects and embodiments of the present invention is configured as a device mainly intended for carrying out cracking processes. The reactor, however, may be adjusted both for steam- and for catalytic cracking of various feedstocks, including carbohydrate- and/or glyceride-based preprocessed feedstock matter. Fatty-acid containing feedstock matter may thus be represented by pine oil.

The reactor may thus be adapted to novel applications, such as cracking free fatty acids, obtained by e.g. breaking down triglycerides contained in vegetable oils and/or animal fats. Direct and/or stepwise decomposing of above mentioned triglyceride-containing products may be performed by means of any appropriate process.

Furthermore, the reactor thus disclosed may be adapted for e.g. emissions mitigation or otherwise for neutralization of any toxic/poisonous gaseous matter. Reaction temperature is in this case close to that utilized for pyrolysis reactions.

For those skilled in art is clear, that common technical parameters of the reactor disclosed, such as rotor speed, temperature of the reaction chamber, residence times history and the like, are configured to be adjustable within certain limits set up by feedstock nature, reaction internal parameters and/or by technical implementation of the device (motor, ring diameter, toroidal distance etc.).

In still another aspect of the invention an arrangement in the form of a pyrolysis plant is provided, wherein said arrangement comprises at least two rotary reactors connected in series or in parallel. Provision of a rotary reactor unit thus supports modular arrangement. An exemplary plant 1000 kt/a ethylene plant unit may be equipped with 40 helical-path reactors, wherefrom 32 reactors are operating and 8 are standby. Said reactors may be built in parallel. An industrial scale helical-path reactor can be preferably provided with a variable speed drive engine with about 10 MW shaft for power delivery to one reactor. Operating speed may be about 3600 rpm, for example. Energy for the drive engine can be preferably supplied from fuel gas, produced during the cracking process. The fuel gas is, in turn, obtained from methane and hydrogen separation units. In the technology provided by utilization of the helical-path reactor fuel gas is likely to be used to drive reactor motors, whereas in the conventional technology the heat of combusted fuel gas is used to warm up the feedstock/dilution steam, boiler feed water and to superheat high pressure steam in the convection section.

In further aspect of the invention a method for thermal cracking of hydrocarbon-containing feedstock is provided, comprising at least some of the following items:
a. obtaining an embodiment of a rotary machine type shock wave reactor as described herein 11a (helical-path), 11b (axial) having a casing 4, a rotor 1, the periphery of which contains an axial-flow vane cascade 2, and particularly in the embodiment of FIGS. 1 and 2A,B—a directing rim 3, provided with at least two stationary vane cascades 8, 9, adjoining an axial-flow rotor cascade, wherein the casing 4 substantially encloses the periphery of the rotor 1 and the directing rim 3; wherein the casing 4 is provided with an inlet port 6 and with an exit port 7; wherein a duct 10 having a substantially ring-shaped meridian cross-section profile is formed between an inner surface of the casing with inlet- and exit ports; and the rotor with the directing rim;
b. increasing the rotation speed of the rotor to reach a predetermined process speed or speed range;
c. feeding the feedstock containing process stream into the inlet port 6, whereupon both stationary cascades 8, 9 and the rotor cascade 2 begin directing the feedstock containing process stream to repeatedly pass through said cascades in accordance with helical trajectory while propagating within the duct between the inlet and exit ports, and sequentially generating stationary shock-waves to heat the feedstock stream within the reacting, causing thermal degradation or pyrolysis thereof, and
d. directing the pyrolyzed product stream through the exit port to a predetermined unit, such as a quenching apparatus.

In still further aspect of the invention, a method of importing energy for fast endothermic- or fast exothermic reaction, the latter being a catalytic hydrogenation reaction, for example, by means of shock waves, produced from mechanical energy of rotating blade cascades, is provided, said method comprising:
a. obtaining an embodiment of a shock wave reactor as described herein 11a, 11b, and
b. passing a preheated gaseous phase, which contains hydrocarbon feedstock or biomass-based feedstock matter, into the reactor 11a, 11b, provided with rotating blades generating mechanical energy to establish shock waves, which provide heat for endothermic reactions of gaseous phase.

It is, however, to be understood, that above mentioned numbers as well as disclosed technical solutions are exemplary and are not intended to limit the invention, but to teach those skilled in art to implement the invention within the limits of the protection scope thereof disclosed in independent claims.

The invention claimed is:

1. A shock wave reactor for thermal cracking of hydrocarbon-containing feedstock, comprising: a casing wherein a duct is formed with at least one inlet and at least one outlet; a rotor, the periphery of which contains an axial-flow blade cascade; wherein the casing substantially encloses the periphery of the rotor and a number of stationary vane cascades inside the duct, and further wherein the stationary vane cascades are configured to direct a feedstock containing process stream to repeatedly pass said stationary vane cascades in accordance with a helical trajectory while propagating within the duct between the inlet and outlet and to generate stationary shock-waves to heat the feedstock.

2. The reactor of claim 1, wherein the duct has a substantially ring-shaped meridian section.

3. The reactor of claim 1, wherein the stationary vane cascades comprise at least two cascades, the first stationary vane cascade being configured upstream and the second stationary vane cascade being configured downstream the axial-flow blade cascade.

4. The reactor of claim 1, wherein the stationary vane cascades comprise at least two cascades, the first stationary vane cascade being configured upstream and the second stationary vane cascade being configured downstream the axial-flow blade cascade, and wherein the stationary vane cascades are arranged such that a vaneless space is created between the first cascade entrance point and second cascade exit point.

5. The reactor claim 1, comprising a stationary directing rim inside the casing, the outer surface of which rim substantially defines the duct to remain therebetween with the inner surface of the casing.

6. The reactor of claim 1, comprising a stationary directing rim inside the casing, the outer surface of which rim substantially defines the duct to remain therebetween with the inner surface of the casing, and wherein the outer surface of the rim is provided with at least some of the stationary vane cascades.

7. The reactor of claim 1, wherein the cascades are substantially adjacent inside the duct.

8. The reactor of claim 1, provided with two inlets and two outlets.

9. The reactor of claim 1, wherein the duct is configured to define a substantially conical, truncated cone-or cylindrical-shaped chamber.

10. The reactor of claim 1, wherein the duct is configured to define a substantially conical, truncated cone-or cylindrical-shaped chamber, wherein blades of the axial-flow rotor cascade(s) are configured to alternate with vanes of corresponding stationary vane cascades in longitudinal direction of the rotor forming sequential cascading units, each unit comprising rotor blade spatially located between stationary vanes.

11. The reactor of claim 1, wherein the duct is configured to define a substantially conical, truncated cone-or cylindrical-shaped chamber, wherein blades of the axial-flow rotor cascade(s) are configured to alternate with vanes of corresponding stationary vane cascades in longitudinal direction of the rotor forming sequential cascading units, each unit comprising rotor blade spatially located between stationary vanes, and wherein the first stationary vane cascade comprises a plurality of nozzle vanes and the second stationary vane cascade comprises a plurality of diffusing vanes, said nozzle and diffusing vanes being configured to mutually alternate in longitudinal direction of the rotor.

12. The reactor of claim 1, wherein the axial-flow blade cascade is configured to provide kinetic energy and to add velocity to feedstock containing process stream, and at least one stationary vane cascade is configured to reduce the velocity of the stream and convert kinetic energy into heat.

13. The reactor of claim 1, wherein the flow velocity of the feedstock containing process stream is supersonic at the cascades and subsonic in the vaneless space within the duct.

14. The reactor of claim 1, wherein at least some of the stationary vane cascades are arranged on the duct wall-defining inner surface of the casing.

15. The reactor of claim 1, wherein at least one inlet and at least one outlet are integrated within the duct.

16. The reactor of claim 1, wherein at least two dividing partitions are arranged within the duct symmetrically relative to a rotor axis so as to form at least two substantially identical operational chambers, each being associated with inlet and exit for the process stream.

17. The reactor of claim 1, wherein the first stationary vane cascade comprises a plurality of nozzle vanes having a curved profile and being disposed by their convex sides in the direction of rotor rotation, and wherein the second stationary vane cascade comprises a plurality of diffusing vanes having a curved supersonic compressor profile and being disposed by convex sides in the direction of rotor rotation.

18. The reactor of claim 1, wherein the axial-flow blade cascade contains a plurality of blades having a profile of active turbine blade, the blades being installed by concave side thereof in the direction of rotor rotation.

19. The reactor of claim 1, configured to process gasified carbohydrate-containing feedstock matter.

20. The reactor of claim 1, configured to process gasified glyceride-containing feedstock matter.

21. The reactor of claim 1, configured to process gasified preprocessed cellulosic biomass material.

22. The reactor of claim 1, configured with a number of catalytic surfaces.

23. The reactor of claim 1, configured with a number of catalytic surfaces, wherein the catalytic surface(s) are formed by catalytic coating of at least several of the individual blades or vanes within the reaction zone and/or by catalytic coating of the duct wall-defining inner surface of the casing.

24. The reactor of claim 1, configured with a number of catalytic surfaces, further comprising a number of catalytic modules defined by ceramic or metallic substrate(s) or support carrier(s) with an active coating optionally realized as monolithic honeycomb structures.

25. The reactor of claim 1, wherein the reactor contains intermediate cooling or heating element.

26. The reactor of claim 1, where the reactor is configured for intermediate injection of diluent or reactive material.

27. The reactor of claim 1, configured such that the time gaseous feedstock spends in the reaction zone is substantially equal or less than about 10 milliseconds.

28. Use of the reactor of claim 1 in executing at least one procedure selected from the group consisting of: processing hydrocarbon feedstock containing medium and light weight hydrocarbon fractions; processing gaseous, oxygen-containing, fatty acid-based feedstock material; processing gaseous, fatty-acid based feedstock material, which material is preprocessed pine oil; processing gaseous cellulose-derived, and in particular, lignocellulose-derived feedstock material; and fast pyrolysis process comprising converting biomass-derived feedstock material into oil.

29. A reactor assembly, comprising at least one reactor according to claim 1 and at least one further element selected from the group consisting of: a drive engine, a heat recovery unit, a quenching unit, a pyrolysis furnace, a pyrolysis furnace with external heating, a pre-heating apparatus or an air filter.

30. A pyrolysis plant, comprising at least two reactors according to claim 1, functionally connected in series or in parallel.

31. A method for thermal cracking of hydrocarbon-containing feedstock, comprising: a. providing a shock wave reactor comprising, a casing wherein a duct is formed with at least one inlet and at least one outlet; a rotor, the periphery of which contains an axial-flow blade cascade; wherein the casing substantially encloses the periphery of the rotor and a number of stationary vane cascades inside the duct, and further wherein the stationary containing process stream to repeatedly pass said stationary vane cascades in accordance with a helical trajectory while propagating within the duct between the at least one inlet and at least one outlet and to generate stationary shock-waves to heat the feedstock; b. elevating a rotation speed of the rotor to reach a predetermined process speed or speed range; c. feeding the feedstock containing process stream into the at least one inlet, whereupon both the stationary vane cascades and the rotor axial-flow blade cascade begin directing the feedstock containing process stream to repeatedly pass through said stationary vane cascades in accordance with the helical trajectory while propagating within the duct between the at least one inlet and at least one outlet, and sequentially generating the stationary shock-waves to heat the feedstock stream within the reactor, causing thermal degradation or pyrolysis thereof; and d. directing the pyrolized product stream through the at least one outlet to a predetermined post-processing unit.

32. Method of claim 31, wherein the feedstock comprises medium or light weight hydrocarbon fractions.

33. Method of claim 31, wherein the feedstock is lignocellulose-derived preprocessed biomass, supplied into the reactor in substantially gaseous form.

34. Method for importing energy for fast endothermic- or fast exothermic reaction produced from mechanical energy of rotating blade cascades, said method comprising: a. providing a shock wave reactor comprising, a casing wherein a duct is formed with at least one inlet and at least one outlet; a rotor, the periphery of which contains an axial-flow blade cascade; wherein the casing substantially encloses the periphery of the rotor and a number of stationary vane cascades inside the duct, and further wherein the stationary containing process stream to repeatedly pass said stationary vane cascades in accordance with a helical trajectory while propagating within the duct between the at least one inlet and at least one outlet and to generate stationary shock-waves to heat the feedstock; and b. passing a preheated, feedstock containing gaseous phase into the reactor to carry out endothermic gaseous phase reactions, wherein the heat is provided by impulses, generated by shock waves resulting from mechanical energy derived from rotation of internal rotor blades.

35. Method of claim 34, wherein the feedstock comprises medium or light weight hydrocarbon fractions.

36. Method of claim 34, wherein the feedstock is cellulose-derived or, in particular, lignocellulose-derived preprocessed biomass, supplied into the reactor in substantially gaseous form.

* * * * *